United States Patent [19]

Swart et al.

[11] Patent Number: 4,933,570

[45] Date of Patent: Jun. 12, 1990

[54] CIRCUIT ARRANGEMENT FOR TRIGGERING A SAFETY SYSTEM

[75] Inventors: Marten Swart, Obertraubling; Helmut Matschi, Barbing, both of Fed. Rep. of Germany

[73] Assignee: Siemens Aktiengesellschaft, Berlin and Munich, Fed. Rep. of Germany

[21] Appl. No.: 147,337

[22] Filed: Jan. 22, 1988

[30] Foreign Application Priority Data

Feb. 24, 1987 [DE] Fed. Rep. of Germany ....... 3705867

[51] Int. Cl.⁵ .............................................. H01H 3/00
[52] U.S. Cl. .................... 307/10.1; 307/9.1; 280/735; 340/429; 340/436; 340/457.1
[58] Field of Search ...................... 307/9, 10 R, 105 B; 180/268, 270, 271, 272, 273, 282, 283, 287, 274; 280/734, 735, 736; 340/429, 436, 457.1

[56] References Cited

U.S. PATENT DOCUMENTS

| | | | |
|---|---|---|---|
| 3,622,974 | 11/1971 | Best | 340/52 H X |
| 3,629,816 | 12/1971 | Gillund | 340/52 H |
| 3,767,002 | 10/1973 | Gillund | 340/52 H X |
| 3,931,866 | 1/1976 | Takada | . |
| 4,163,268 | 7/1979 | Spies et al. | 280/735 X |
| 4,222,030 | 9/1980 | Yasui et al. | 340/52 H |
| 4,346,913 | 8/1982 | Schauf et al. | 280/735 |
| 4,384,734 | 5/1983 | Yasui | 280/735 |
| 4,740,741 | 4/1988 | Andres et al. | 340/52 H |

FOREIGN PATENT DOCUMENTS 0022146 1/1981 European Pat. Off. .

Primary Examiner—William M. Shoop, Jr.
Assistant Examiner—Paul Ip
Attorney, Agent, or Firm—Hill, Van Santen, Steadman & Simpson

[57] ABSTRACT

A circuit arrangement for triggering a safety system. A circuit arrangement serves the purpose of triggering a motor vehicle air bag system and contains an energy source, at least one release switch and at least two series branches connected in parallel and each branch has a tripping device for an air bag. A series capacitor is provided in every series branch, this capacitor limiting the current quantity in the tripped case in order to guarantee a reliable tripping of the further tripping device which acts with a time delay.

14 Claims, 1 Drawing Sheet

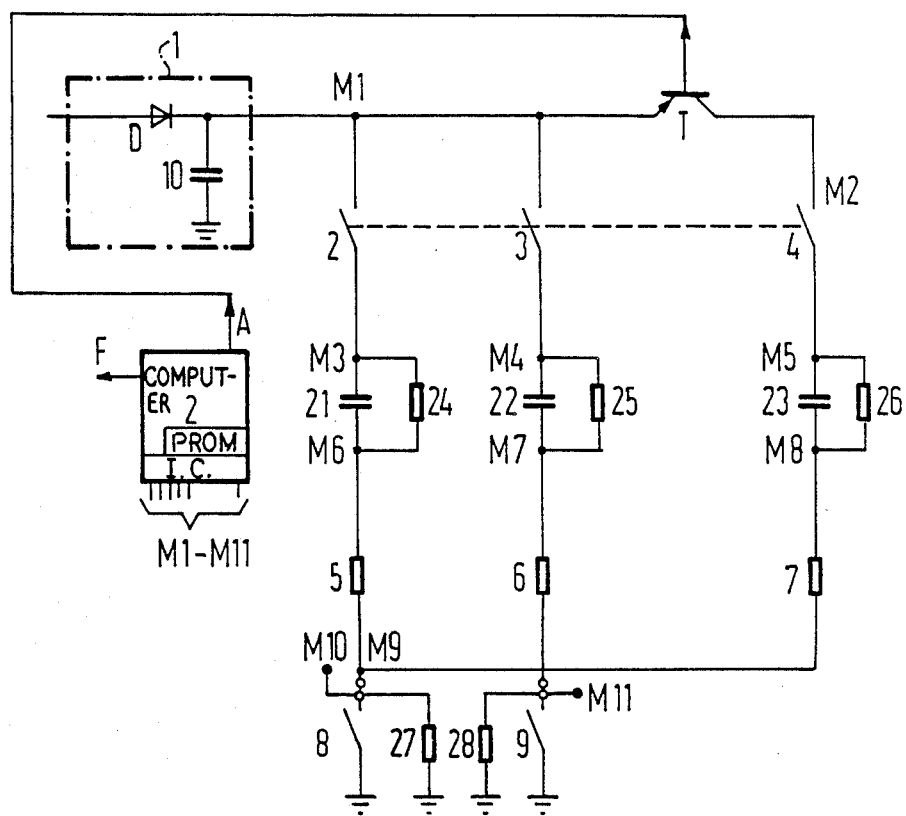

CIRCUIT ARRANGEMENT FOR TRIGGERING A SAFETY SYSTEM

BACKGROUND OF THE INVENTION

The invention is directed to a circuit arrangement for triggering a safety system, particularly in an air bag system.

Such a circuit arrangement when used in a motor vehicle air-bag system, usually has a series branch having a tripping device and two series-connected release switches per air bag. These two release switches are actuated by two delay sensors acting independently of one another, so that a tripping only occurs in response to both delay sensors.

When an air bag is provided for a driver and a front seat passenger in a motor vehicle, then two such series branches are required. The two series branches are connected parallel to one another and are supplied with voltage from a common energy source, normally the vehicle battery. Such a circuit arrangement is disclosed, for example, by European patent No. 0 022 146.

Chemical detonating caps triggered by an electrical current flux are usually employed as tripping devices for motor vehicle air bags. As set forth above, the detonating caps for the driver air bag and the front seat passenger air bag are connected in parallel. Due to different switching times of the release switches and different reaction times of the detonating caps themselves, their tripping does not ensue simulateously in case of a crash of the vehicle. After the tripping of the first detonating cap, however, a reliable ignition of the second detonating cap is only possible when the first remains in a high-impedence state after ignition.

Tests that have been carried out with such detonating caps have shown that this is not always the case. In some instances, detonating caps leave conductive connections behind after ignition, so that the energy source is shorted and, thus, an ignition of the second detonating cap is impossible.

SUMMARY OF THE INVENTION

It is therefore an object of the present invention to provide such a circuit arrangement such that reliable tripping of all detonating caps is guaranteed in every case. A further concern of the invention is to be able to determine after an accident whether the cause for a detonating cap which was erroneously not ignited lay in the circuit arrangement or in a fault of the detonating cap itself.

The circuit arrangement serves the purpose of triggering a motor vehicle air bag system and contains an energy source, at least one release switch and at least two series branches connected in parallel and each branch has a tripping device for an air bag. A series capacitor is provided in every series branch, this capacitor limits the current flow in the tripped case in order to guarantee reliable tripping of the remaining tripping device which acts with a time delay.

A series capacitor is provided in every series branch. When tripped, this capacitor allows a brief current flux which activates the tripping device, and then the capacitor itself is charged. The current flux can only last until the voltage at the capacitor is equal to the voltage at the energy source. From this point in time, the capacitor inhibits the series branch in which it and the ignited detonating cap reside, regardless of whether the ignited detonating cap represents a short circuit. In particular, no further charge amount can now be used in the series branch, this being required for igniting further detonating caps.

The invention is especially advantageous when, in order to increase reliability, a trigger capacitor serves as the energy source instead of the vehicle battery, since the vehicle battery can be suddenly disconnected from the air bag system or destroyed in case of a crash. The capacitor used in accordance with the invention simultaneously solves the problem here that the charge amount flowing through every series branch in the tripped case must also be limited because of the relatively low energy content of the trigger capacitor.

Further, an evaluator is also provided, this serving the purpose of continuously documenting the proper function of the circuit arrangement. To this end, the voltages at every capacitor and at every tripping device are supplied to the evaluator.

When a voltage discontinuity appears at one of the tripping devices, the evaluator recognizes the point in time of tripping therefrom. After the lapse of a short measuring interval, it measures the voltage at the associated capacitor beginning from this point in time of tripping. The measuring interval is selected such that, given an intact circuit arrangement, a charge amount adequate for tripping has flowed. The evaluator stores the value of this voltage in a memory which can only be erased by mechanical destruction. The voltage is a measure of the charge amount which has actually flowed through the tripping device. Following an accident wherein a tripping device had not triggered, information is available to determine if the cause lay in a defective circuit arrangement or in a defective tripping device.

Instead of the voltage value, the evaluator can also deposit some other quantity in the memory, for example the charge amount calculated with the voltage value or the information directly derived therefrom as to whether this charge amount was adequate for ignition.

BRIEF DESCRIPTION OF THE DRAWINGS

The of the present invention which are believed to be novel, are set forth with particularity in the appended claims. The invention, together with further objects and advantages, may best be understood by reference to the following description taken in conjunction with the accompanying drawings, in the several figures of which like reference numerals identify like elements, and in which:

The single FIGURE is a circuit diagram of the present invention.

DESCRIPTION OF THE PREFERRED EMBODIMENT

The illustrated circuit arrangement of the FIGURE serves the purpose of tripping a motor vehicle air bag system. A common energy source 1 is connected to three series branches connected parallel to one another, each of these containing an electrically actuatable, chemical detonating cap 5, 6, 7. The detonating caps 5, 6, 7 are the tripping devices for two air bags, whereby one is provided for a driver air bag and the two others are provided for a front seat passenger air bag. The front seat passenger air bag has two tripping devices since it must be larger than the driver air bag due to the lack of the steering wheel and its inflation ensues in two stages.

The energy source 1 contains a trigger capacitor 10 which is charged to 36 volts via the Diode D with a charging means (not shown here) and which is constantly kept at this voltage.

The three series branches supplied by the trigger capacitor 10 each contain a release switch 2, 3, 4, a capacitor 21, 22, 23 each having a resistor 24, 25, 26 connected in parallel, the detonating cap 5, 6, 7 and a further release switch 8,9 connected as shown. The series branch having detonating cap 7 serves the purpose of triggering the second stage of the front seat passenger air bag and, for this purpose, also contains a delay transistor T whose emitter is connected to the energy source 1 and whose collector is connected to a terminal of the release switch 4 at the side of the supply voltage. The base for driving the delay transistor T is connected to an output A of an evaluator 2.

The release switches 2, 3, 4 are mechanically coupled, this being indicated by the dotted line, and are actuated by a mechanical delay sensor. One of the two release switches 8,9 serves as a second switch for every series branch, whereby each is controlled by its own mechanical delay sensor, a front sensor.

A tripping of the air bag system thus occurs when the mechanical delay sensor and one of the two front sensors is activated. The mechanical delay sensor is thereby arranged at a central location of the motor vehicle and the two front sensors are located at the right front and left front of the vehicle.

When tripped, one of the two detonating caps 5, 6 will trigger first, then the other, due to a longer switch or reaction time and, finally, the detonating cap 7 will trigger following the delay time determined by the delay transistor T. As an example, let it be assumed that the detonating cap 5 triggers first and a short between the capacitor 21 and ground exists after the triggering. Without this capacitor 21, the trigger capacitor 10 would thereby completely discharge and an ignition of the detonating caps 6,7 would be impossible. The presence of the capacitor 21, however, only allows a current flow until the capacitor 21 has charged to the 36 volts of the trigger capacitor 10 and then interrupts the current flow. This enables the ignition of the detonating cap 6, whereupon the events in the series branch thereof sequence analogously to those in the detonating cap 5 triggered first. A reliable triggering of the detonating cap 7 triggered delayed via the transistor T is thus also possible. The delay time amounts to 10 milliseconds beginning from the ignition time of the first detonating cap 5 and is determined by the evaluator 2 which supplies a control voltage for the delay transistor at the output A.

The capacity of the capacitors 21, 22, 23 is selected such that, first, the limited charge amount for triggering the detonating caps 5, 6, 7 is large enough and, second, such that the energy content of the ignition trigger capacitor 10 is sure to be adequate for all detonating caps 5, 6, 7. For a trigger capacitor 10 having 4.7 millifarads, therefore, the capacitors 21, 22, 23 were each selected at 1 millifarad.

The evaluator 2 also serves the purpose of documenting malfunctions as well as various monitoring jobs. It has a microprocessor having a PROM as well as an integrated circuit via which it is connected to the measuring points M1-M11 of the remaining circuit.

The integrated circuit serves as an interface between the digitally operating microprocessor and the analog voltages and currents from and to the measuring points M1-M11 as well as the delay transistor T.

Via the measuring points M1-M11, the evaluator 2 carries out measurements of voltage, current and resistance. Thus evaluated in cyclical repetition in a ready mode of the circuit arrangement are:

voltages $U_{M1-M3}$, $U_{M1-M4}$ and $U_{M1-M5}$ across the release switches 2, 3, 4 (an error is given for a closed switch in the ready mode);

voltages $U_{M6-M9}$, $U_{M7-M9}$ and $U_{M8-M9}$ for identifying the respective point in time of tripping which is assumed to be when a voltage of 4 volts is reached;

a resistance measurement with constant current from the measuring points M3 through M11 to ground (an error is given for a short from a measuring point to ground);

a resistance measurement at the detonating caps between the measuring points M6 and M9, M7 and M9, as well as M8 and M9 for identifying changes in the detonating caps 5, 6, 7 (an error is given for a deviation from the manufacturer's specification);

the capacity of the capacitors by voltage measurement after applying a constant current for a time period, t via M3 and M6, M4 and M7, as well as M5 and M8 (an error is given for too low a capacitance indicating a malfunctioning capacitor);

a transfer resistance measurement between M9 and M10 and M9 and M11 at the release switches 8, 9 of the front sensors. The release switches 8, 9 have two contacts at the side of the supply voltage which are electrically connected to one another in the switch. After the external wiring is soldered to the contacts, a measurement of the transfer resistance of the solder locations as well as of the connecting lines is possible. The solder locations are indicated with small circles in the drawing. (An error is given for too high a transfer resistance).

Each of the measuring points M10 and M11 is also connected via one of the contacts of the release switches 8, 9 to a resistor 27, 28 whose other terminal is connected to ground. The evaluator 2 receives its reference potential via these connections, i.e. via M10 and M11.

When the evaluator 2 identifies a faulty condition in one of the measurements set forth above, it stores the result in the PROM and generates an error report F that provides an alarm output for the driver.

When the voltage at one of the detonating caps 5, 6, 7 reaches the value of 4 volts, its point in time of tripping is estalished. The evaluator 2 then acquires the voltage at the respectively appertaining capacitor 21, 22, 23 3 milliseconds later and stores this information in the PROM. Given knowledge of the electrical quantities of the circuit elements, this voltage value allows the calculation of the charge amount which has flowed from the ignition up to the expiration of the measuring time of 3 milliseconds. In the tripped case, this measurement is carried out at each of the capacitors 21, 22, 23. The voltage values stored in the PROM in this respect also provide information about the proper function of the circuit arrangement even after an accident. When the charge amount that flowed during the measuring time was adequate for the ignition of one of the detonating caps 5, 6, 7 in comparison to the manufacturer's specification and when the ignition nonetheless did not occur, then the cause of the failure is the respective detonating cap.

The resistors 24, 25, 26 respectively connected parallel to the capacitors 21, 22, 23 is an advantageous expansion of the invention. In the ready mode of the circuit arrangement, this resistor provides that the capacitors 21, 22, 23 are again completely discharged after every measurement. A defined initial condition, capacitor discharge, is thus established for the respective measurement as well as for the limitation of the charge amount in the tripped case.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A circuit arrangement for triggering a safety system, particularly an air bag system, having an energy source connected in series with at least one release switch also in series with at least two series branches connected in parallel, each of which contains a tripping device for the safety system, comprising a capacitor in each of said branches, said capacitor limiting the charge amount flowing through the respective series branch.

2. A circuit arrangement for triggering a safety system, particularly an air bag system, having an energy source connected in series with at least one release switch also in series with at least two series branches connected in parallel, each of which contains a tripping device for the safety system, comprising a capacitor in each of said series branches, said capacitor limiting the charge amount flowing through the respective series branch, and an evaluator receiving a voltage at each of said capacitors, the evaluator acquiring this voltage at the end of a measuring interval which begins with the point in time of tripping and storing the voltage value thereof in a memory.

3. The circuit arrangement according to claim 2, wherein the evaluator receives a voltage at every tripping device and identifies the point in time of tripping from a voltage discontinuity.

4. The circuit arrangement according to claim 3, wherein the evaluator derives another value from the voltage and stores said another value in the memory.

5. The circuit arrangement according to claim 2, wherein the content of the memory can only be erased by mechanical destruction.

6. The circuit arrangement according to claim 2, wherein the evaluator contains an integrated circuit connected to a microprocessor which is connected to said memory.

7. The circuit arrangement according to claim 1, wherein a resistor is connected in parallel to each of said capacitors, respectively.

8. A circuit arrangement for triggering a safety system, comprising:
    an energy source;
    at least two series circuit branches connected in parallel, each of said circuit branches connected between said energy source and ground, and having at least a capacitor for limiting the current flowing through the circuit branch in series with a tripping device for activating the safety system.

9. The circuit arrangement according to claim 8, wherein said circuit arrangement further comprises a release switch mechanism having at least two mechanically coupled release switches connected between said energy source and said two circuit branches, one release switch associated with one circuit branch and the other release switch associated with the other circuit branch.

10. The circuit arrangement according to claim 8, wherein said circuit arrangement further comprises a resistor connector in parallel to said capacitor for each of said circuit branches.

11. The circuit arrangement according to claim 8, wherein said circuit arrangement further comprises at least one release switch in series with said energy source and said circuit branches.

12. A circuit arrangement for triggering a safety system, comprising:
    an energy source:
    at least two series circuit branches connected in parallel, each of said circuit branches connected between said energy source and ground; each of said circuit branches having at least a capacitor for limiting the current flowing through the circuit branch in series with a tripping device for activating the safety system; and an evaluator which receives a voltage at each of said capacitors, the evaluator acquiring this voltage at the end of a measuring interval which begins with the point in time of tripping and stores the voltage value thereof in a memory.

13. The circuit arrangement according to claim 12, wherein said evaluator receives a voltage at every tripping device and identifies the point in time of tripping from a voltage discontinuity.

14. The circuit arrangement according to claim 13, wherein said evaluator has an integrated circuit for interfacing with said circuit branches, a programmable read only memory, and a microprocessor connected to said integrated circuit and said programmable read only memory.

* * * * *